(No Model.) 2 Sheets—Sheet 1.
W. C. DICKERSON.
COMBINED PORTABLE WATER HEATER AND STOVE.
No. 524,891. Patented Aug. 21, 1894.
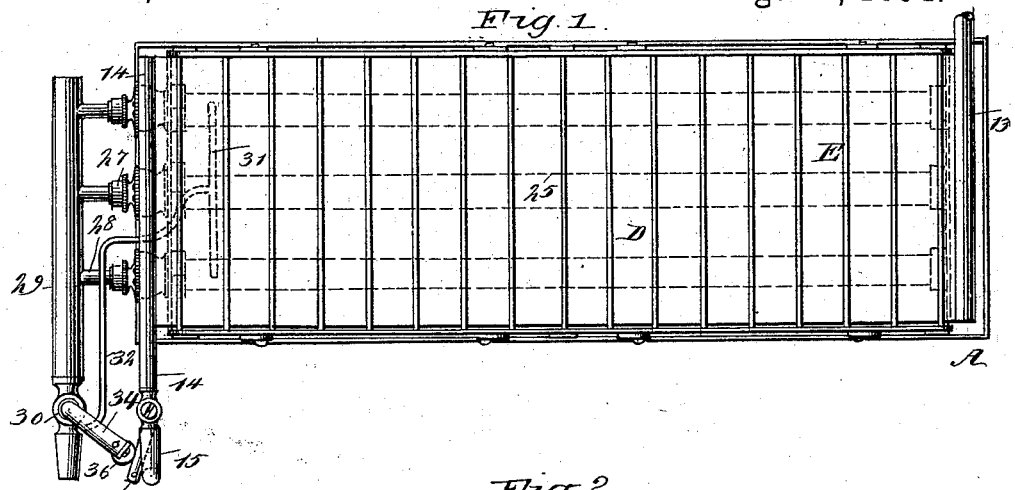
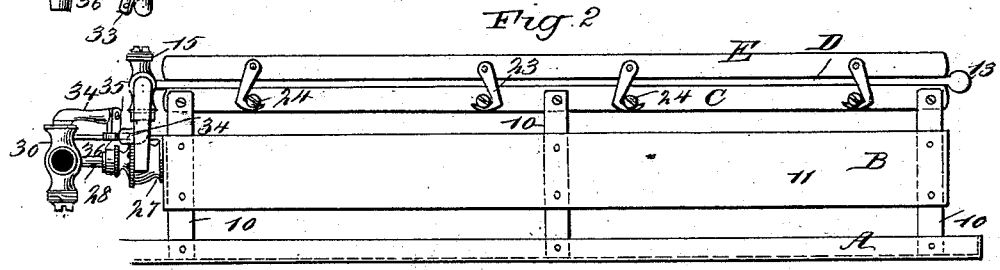
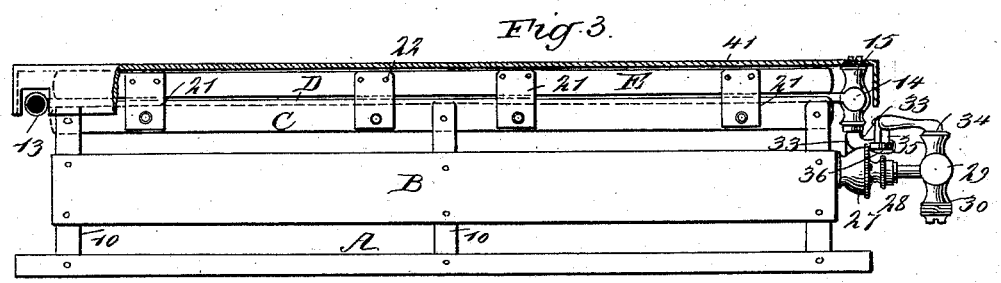
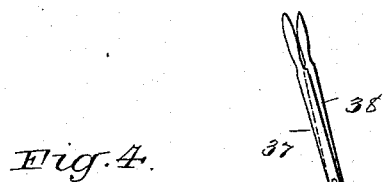
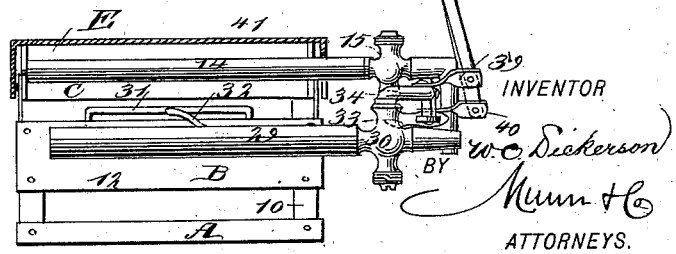
WITNESSES:
Paul Johst
C. Sedgwick
INVENTOR
W. C. Dickerson
BY
Munn & Co
ATTORNEYS.

(No Model.) 2 Sheets—Sheet 2.

W. C. DICKERSON.
COMBINED PORTABLE WATER HEATER AND STOVE.

No. 524,891. Patented Aug. 21, 1894.

WITNESSES:
Paul Jahod
C. Sedgwick

INVENTOR
W. C. Dickerson
BY
Munn & Co
ATTORNEYS.

UNITED STATES PATENT OFFICE.

WARREN C. DICKERSON, OF NEW YORK, N. Y.

COMBINED PORTABLE WATER-HEATER AND STOVE.

SPECIFICATION forming part of Letters Patent No. 524,891, dated August 21, 1894.

Application filed September 4, 1893. Serial No. 484,733. (No model.)

*To all whom it may concern:*

Be it known that I, WARREN C. DICKERSON, of New York city, in the county and State of New York, have invented a new and Improved Combined Portable Water-Heater and Stove, of which the following is a full, clear, and exact description.

My invention relates to a combined water heater and stove, and it has for its object to provide an article which may be utilized for heating water in a rapid manner and to a high degree in a short space of time, and wherein the water while being heated may enter at one portion of the stove and pass out at another.

A further feature of the invention is to provide a water heater which will be exceedingly simple, durable and economic in its construction, and which will be especially adapted for use in connection with bath rooms and for like purposes.

Another feature of the invention consists in so connecting the faucet through which the water finds an exit, with the faucet controlling the heating agent, that when the water is cut off at the exit end of its reservoir the supply of gas will be suddenly and automatically cut off also, and whereby further, when the supply of gas is cut off the exit of water need not be necessarily stopped, and whereby also the water may be permitted to flow without interfering with the supply of heating material.

Another feature of the invention consists in so constructing the stove and heater, that with but little trouble and in a short space of time, the water attachment may be removed and the device utilized for heating and cooking purposes.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 5:
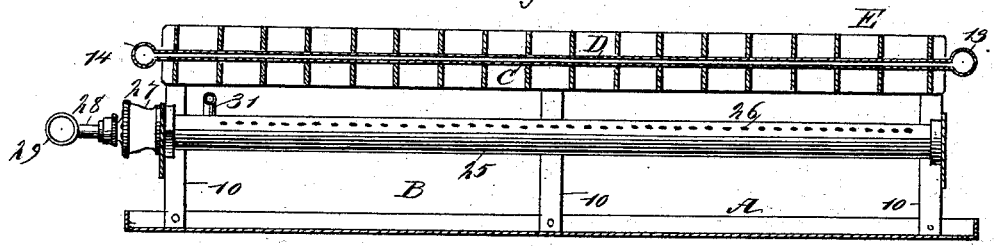
Figure 6:
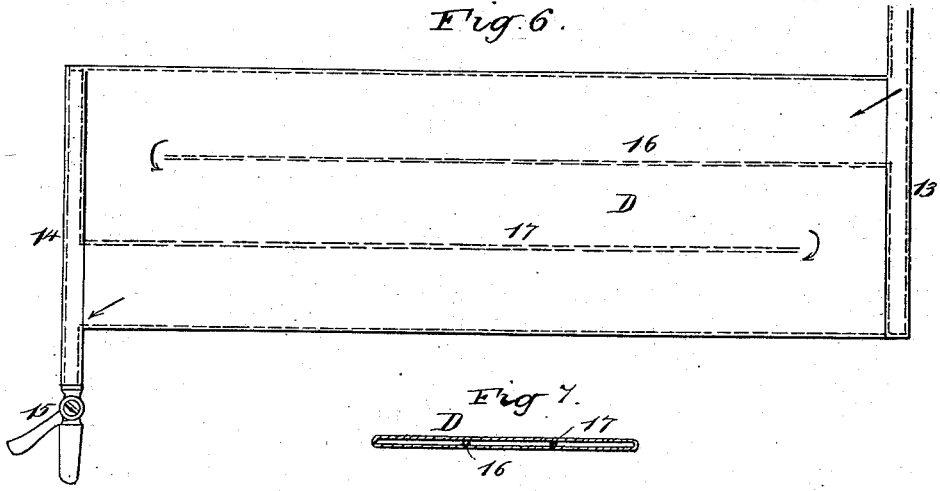
Figure 7:
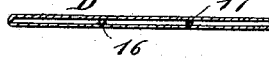
Figure 8:
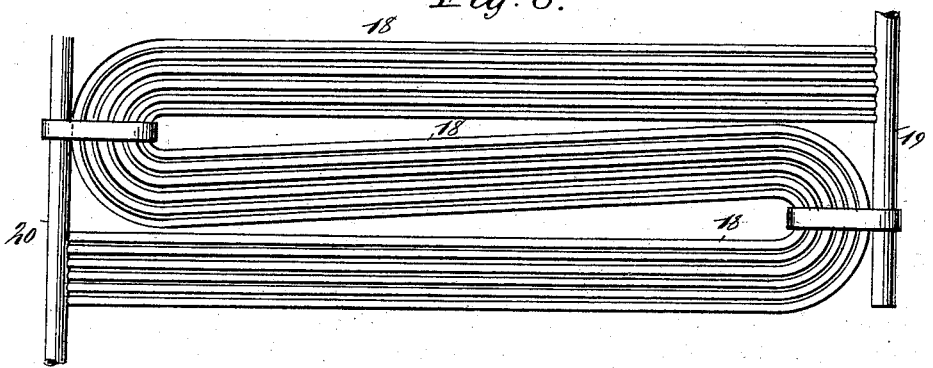

Figure 1 is a plan view of the combined stove and heater, the cap being removed therefrom. Fig. 2 is a side elevation thereof. Fig. 3 is a view of the side opposite that shown in Fig. 2, the cap being shown in position, and portions of it being broken away. Fig. 4 is an end view of the stove and heater, the cap being in transverse section. Fig. 5 is a longitudinal vertical section through the stove and heater. Fig. 6 is a plan view of the water heating compartment or pan. Fig. 7 is a transverse section through the pan; and Fig. 8 is a plan view of a modified form of water receptacle, being adapted as a substitute for the pan.

The body of the stove and heater consists of a base A, which may be and preferably is in the nature of a pan, and a box-like receptacle B, which rests upon and is secured to the base in any suitable or approved manner, the said box-like section being open at the top. In the drawings the box-like section B of the body is represented as consisting of a series of standards 10, which are secured to the base, and side and end plates designated respectively as 11 and 12, the said plates being secured to the said standards, and the standards are shown as located at the ends of the plates and intermediate of the ends of the side plates.

A grating C, is rigidly secured in any desired manner to the upper ends of the standards, a space being made to intervene the lower edges of the grating and the upper portion of the end and side plates of the body, the standards being carried upward above the said plates. The grating C, is adapted to receive and support a water pan D, or other form of water receptacle. When a pan is employed, it is made practically of the same shape as the grating, which is substantially rectangular. The pan is closed at top and bottom and at its side edges, and terminates at each end preferably in a transversely located tube, said tubular portions of the pan being designated respectively as 13 and 14. The tubular portions of the pan extend beyond opposite side edges, and the tube 13 at one end is adapted to be connected with a source of water supply, while the projecting end of the opposite tube 14, is provided with a cock or faucet 15, through which the water is to find its escape.

In order that the water may take a circuitous route in passing from the inlet to the outlet, partitions are located in the pan longitudinally thereof, which partitions may be of any desired number, two being shown in the drawings designated as 16 and 17. The partitions extend alternately from opposite ends of the pan, and terminate a predetermined distance from the opposing end; and when two partitions are employed, as shown also in Fig. 6, one of them connects with the end of the pan in front of the inlet thereof, while the other connects with the end of the pan in front of the outlet. The pan or reservoir is thus provided with circuitous channels, and therefore, as shown by the arrows in Fig. 6, the water entering at the inlet will pass to the opposite end of the pan, thence in direction of the end at which it entered, through the space between the two partitions, and finally the water will enter the space leading to the outlet of the pan, and may be drawn off at the faucet 15. It will be understood that the partitions extend from top to bottom of the pan.

In Fig. 8 I have illustrated a substitute for the pan, consisting of coils of pipes 18, connected at opposite ends respectively with an inlet tube 19 and an outlet tube 20. This form of reservoir is likewise provided with circuitous channels for the passage of the water. Either the coil or the pan may be employed in the heating of water, and both of them will maintain the water for a maximum of time in contact with the heating agent, and in each case the water will pass through circuitous channels, so that it will be heated to a high degree when both the inlet and the outlet of the pan, or of the coils, are opened.

In order to maintain the coil or the pan in position upon the grating C, and to strengthen the walls of the reservoir against water pressure a second grating E, is preferably placed upon the upper surface of the pan or coil, as shown in the drawings. The upper grating is removable, and it may be hinged to the lower grating at one side, being engaged by catches at the opposite side; or as illustrated in Fig. 3, lugs 21, may be projected upward from one side of the lower grating, the upper portion of the lugs being provided with apertures which are to receive pins 22, located upon the sides of the upper grating; while at the opposite side of the upper grating hooks 23, or other form of locking devices, are located, adapted for engagement with keepers 24 carried by the lower grating C.

Any form of heating agent may be employed to heat the pan, or the coil 18, when used. In the drawings a heating apparatus is illustrated adapted especially for gas; but burners may be used adapted to burn gasoline, oil, or other inflammable substances. When gas is used, a series of burners, preferably three, is located beneath the lower grating, being carried by the body of the device. These burners are in the nature of tubes 25, which extend from one end of the body to the other. The tubes are closed at one end through the means of a plug, or in any approved manner, and are provided in their upper surfaces with series of apertures 26, while the opposite ends of the tubes are connected with air caps 27, into which caps branches 28 from a gas supply pipe 29, are projected. The gas supply pipe is adapted for connection with any source of gas supply, and at or near one end of the gas supply pipe a faucet or stop cock 30, is located, which controls the supply of gas from the source of supply to the branches leading to the burners.

A small perforated tube 31, is held transversely over the burners 25, near their receiving ends, as shown in dotted lines in Fig. 1; and the perforated tube 31, is connected with the main supply pipe 29 between the source of gas supply and the stop cock 30 by means of a supply tube 32. Thus a small quantity of gas will be at all times supplied to the perforated tube or pipe 31, and the gas is always kept lighted at the perforations in this tube. Thus the tube may be denominated a lighting tube, as at the moment the gas is turned on to the burners the gas will be ignited at all of the openings 26 in the burners through the medium of the flame at the lighting tube 31.

The handle 33 of the water faucet 15, is preferably a crank handle, and is located at the bottom of the faucet, as illustrated in Figs. 1, 3 and 4, while the handle 34 of the gas stop cock 30, is located at the top of the cock and is likewise a crank handle, but the handle of the gas stop cock is provided with a downwardly-extending lug 35, at its outer end, the said lug being made to carry a friction roller 36 or the equivalent thereof; and the wheel or roller 36, is adapted for engagement with a straight surface formed upon one side of the handle 33 of the water faucet.

The handles of both the faucet and the stop cock may be manipulated through the medium of levers, as shown in Fig. 4, in which two levers 37 and 38 are illustrated, one of which is connected by a link 39 with the handle 34 of the stop cock, while the other is connected by a link 40 with the handle 33 of the water faucet. By placing the two handles in the above named relation to each other, that is, causing one handle to engage with the back of the other, in the event the handle of the faucet is manipulated to shut off the supply of water, the handle in being turned in the proper direction to accomplish such result, will turn with it the handle of the stop cock in a manner to cut off the supply of gas proportionately as the supply of water is cut off; and the gas can not be turned on without turning on the water, since the handle of the water faucet is in the path of the handle of the gas cock; but the water may be turned on by the manipulation of the handle of the faucet 15 without interfering with the gas stop cock. In this manner the likelihood of an accident is rendered exceedingly remote, since although the persons attending the stove or heater may be very careless the flow of water cannot be cut off and the burners remain burning.

A cap 41, is preferably used to cover the entire upper grating in order to prevent the escape of heat; and when the stove is needed for cooking purposes, for example, the upper grating and the pan, or the coil if it is used, may be removed expeditiously and conveniently; and it will be understood that the water may be conveyed from the faucet 15 to a bath, or to any point that may be required.

With an apparatus constructed as above described the water may be permitted to flow constantly through the pan, and when the burners have been properly lighted the water in the pan will become heated to a high degree of temperature before it leaves the pan, therefore rendering the device well adapted for use in a bath room, especially in the summer when the range boiler is not being used; and even in the winter the device is valuable for the purpose above set forth, as a supply of hot water may be obtained independently of the boiler supply; or the apparatus may be used only for heating purposes.

Having thus described my invention, I claim as new and desire to secure by Letters Patent—

1. In a water heater, a heating apparatus, a water reservoir located adjacent to the same, the reservoir being provided with circuitous channels through which the water is compelled to pass, and further provided with an inlet at one end and an outlet at the opposite end, a regulating device located at the outlet of the water receptacle, a regulator forming a portion of the heating apparatus, and a connection between the two regulators, whereby when one is moved to a cut-off position the other will be moved to a like position, as and for the purpose specified.

2. In a water heater, a water receptacle, a grating on which the said receptacle is removably supported, a locking frame resting upon the said receptacle, and means for detachably connecting the grating with the locking frame, substantially as described.

3. In a hot water heater, the grating, C, arranged over the burners, the hollow water-receptacle, D, laid and supported upon said grating, and having inlet and outlet as specified, the removable locking frame, E, resting upon said receptacle, and locking devices which detachably connect it with the grating, as shown and described.

4. In a combined stove and water heater, the combination, with burners and a grating located above the burners, of a water receptacle or reservoir removably located upon the grating, provided with circuitous channels through which the water is adapted to pass, and a faucet at its exit end, a locking frame removably located upon the water receptacle, maintaining it in position, a stop cock adapted to regulate the supply of fuel to the burners, and an interlocking connection between the stop cock and the faucet of the water receptacle, whereby the two move simultaneously when the supply of water is cut off or the supply of fuel turned on, as and for the purpose specified.

WARREN C. DICKERSON.

Witnesses:
J. FRED ACKER,
C. SEDGWICK.